Dec. 3, 1968  W. GRESCH  3,414,202
MIXING APPARATUS
Filed March 14, 1966  2 Sheets-Sheet 1
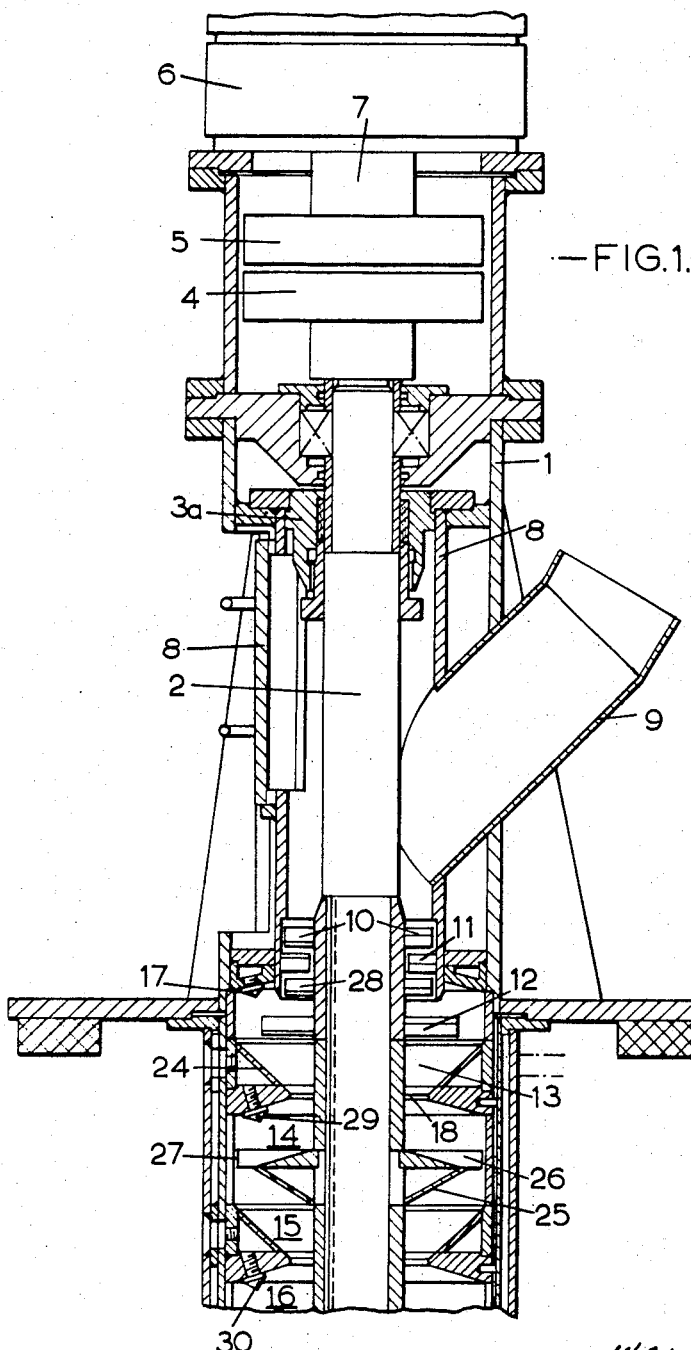
—FIG.1.—
INVENTOR:
WALTER GRESCH
BY
Jacob L. Collin
Attorney

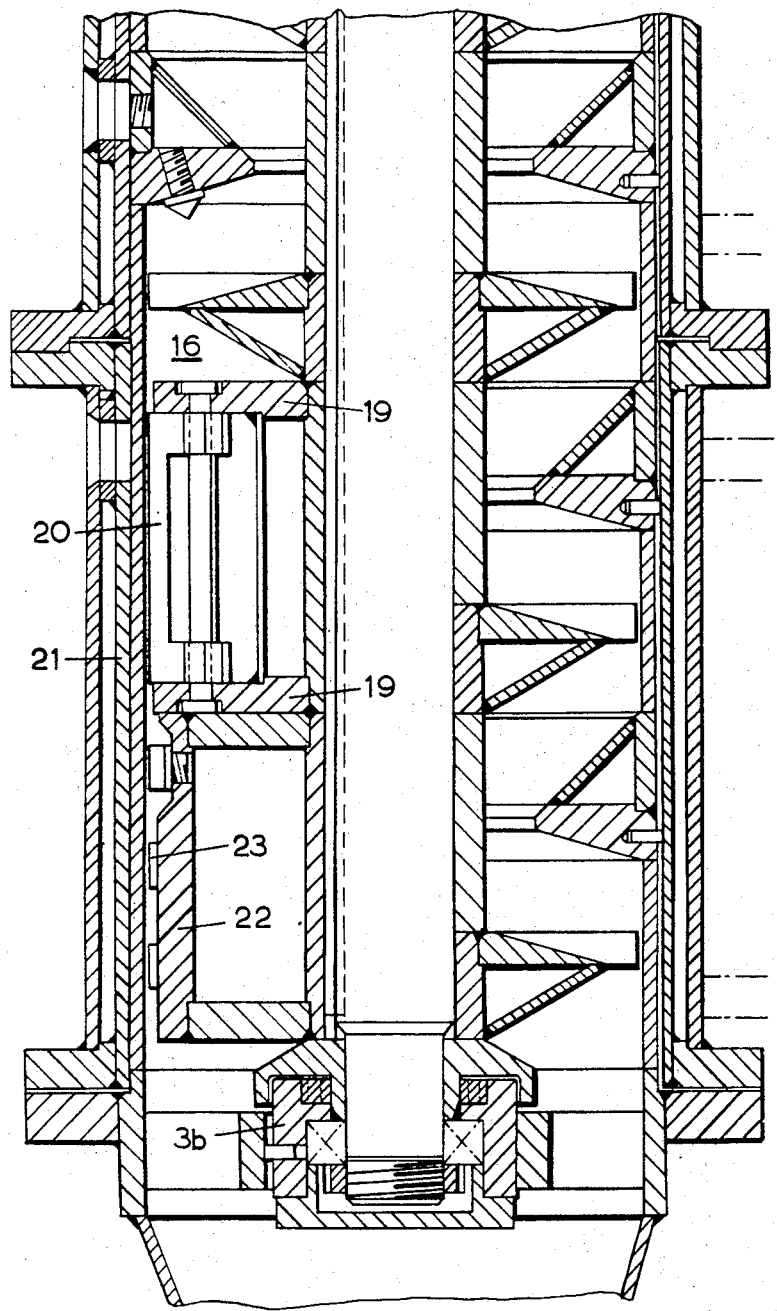
—FIG.2.—

3,414,202
MIXING APPARATUS
Walter Gresch, 55 Lachmattstrasse,
Muttenz, Switzerland
Filed Mar. 14, 1966, Ser. No. 533,967
1 Claim. (Cl. 241—42)

ABSTRACT OF THE DISCLOSURE

An apparatus for performing mixing, reaction and dissolving processes and preventing the formation of partially solved agglomerates, thereby reducing the effective power requirement for the process and so obviating stressing the material. The apparatus has a subdivided tubular housing vertically mounted, provided with fixed and rotatable elements plus nozzle feed members for injecting liquid into the chambers; all rotary or fixed blade-elements being so inclined that materials introduced by a chute at the upper part are conveyed vertically downwards.

---

The present invention concerns an apparatus for performing mixing, reaction and dissolving processes between solid and liquid starting materials, more especially for producing plastics material solutions from a powdery plastics material and a solvent.

When producing plastics material solutions the formation of unpleasant insoluble nodules has been noticeable. The cause of the formation of these nodules is that the solvent encloses a certain quantity of plastics material powder and forms a jelly-like envelope which sets up considerable resistance to the penetration of the solvent to the enclosed powder. Similar problems have arisen in certain reaction processes if, for a perfect conversion, it is a necessary condition that the solid matter has to be distributed uniformly and without nodules in the liquid phase. The object of the invention is to provide an apparatus in which the said disadvantages are overcome.

The apparatus in accordance with the invention is characterised by the feature that it has a vertical shaft with comminuting members and is rotatably mounted in a housing. Along the shaft treatment chambers are arranged one below another, into which chambers nozzle-like feed members are adapted to inject the liquid starting material.

The invention will be described further, by way of example, with reference to the accompanying drawings, in which:

FIG. 1 is a vertical section through the essential parts of the apparatus in accordance with the invention, and FIG. 2 is an enlarged detail of a further embodiment of the apparatus.

FIG. 1 shows a tubular housing 1 in which a vertical shaft 2 is coaxially guided by means of bearing members 3a and 3b. A clutch plate 4 is arranged on the upper end of shaft 2 and cooperates with a corresponding clutch plate 5 driven by a prime mover 6 via a shaft 7. The upper bearing member 3a also acts as a closure of the housing 1.

A protective pipe 8, which is provided with a chute 9 for supplying solid material, is arranged inside the housing 1 and coaxially with shaft 2. Below the lead-in point of the chute 9, shaft 2 is provided with blades 10 and 28 which rotate with the shaft. Between these rotary blades 10, 28 stationary blades 11 are distributed over the periphery of the inner surface of the protective pipe 8. Both the rotary and the fixed blades are downwardly inclined, so that solid material supplied via the chute 9 is conveyed vertically downwards. Below the protective pipe 8 there is a rotary blade 12 of somewhat larger diameter, which is also arranged on shaft 2. The lower portion of the housing 1 has compartment-like chambers 13, 14, 15, 16, and radially distributed nozzles 17, 29, 30 which serve to supply liquid into the chambers 13, 14 and 16.

Between the chambers 13 and 14, 15 and 16, inwardly constricted conical annular guides 24 are inserted, each of which forming the lower closure of its respective chamber, whilst leaving an annular connecting opening 18 between the chambers. A rotary element 25 tapering conically outwardly is mounted on shaft 2 and located between the chambers 14 and 15, which element 25 is provided with downwardly stirring blades 26. This element forms the lower closure of chamber 14 whilst leaving an annular communication opening 27 in which the stirring blades 26 may rotate.

The left hand side of FIG. 2 shows an alternative embodiment of the apparatus. Below the chamber 16 there is provided a rotary holder 19 comprising two discs extending perpendicular relative to the shaft 2, between which discs pivotal wipers 20 are mounted so as to be freely rotatable. The arrangement in this case is such that the pivotal wipers are pressed by centrifugal force against the housing wall 21, so that only a thin layer of mixing material adheres to the housing wall.

A further stage is arranged below the pivotal wipers 20 and comprises a rotary drum 22 carrying cams 23 distributed spirally over its periphery. The mixing action in certain cases is improved by the rotating cam drum. If an increased product temperature is required, it is possible for both the pivotal wipers and the cam drum to achieve this by producing frictional heat.

In operation, the solid material is introduced in the form of powder through the chute 9 into the apparatus, whereupon the material is engaged by the rotary blades 10 and rotated. In collaboration with the rotary blades 10, 28 and fixed blades 11, the relatively loose agglomerate is crushed. The blades 28 cause the material to be rotated again, so that it is thrown radially outwards by the centrifugal force. Liquid is injected through the nozzles 17. The blades 12 forcibly convey downwards the wetted or mixed-to-a-paste material. The conical surface of the annular guide 24 located in chamber 13 again renders motionless the material previously rotated by the blades 12 and acting as a labyrinth guide, transfers it to chamber 14. Here it is again rotated by the rotor element 25 and thrown radially outwards whilst simultaneously receiving further liquid injected into chamber 14 through the nozzles 29. The blades 26 support this motion and assist in conveying the material into chamber 16. The same treatment may be continued through further chambers.

To assist the mixing effect it is finally possible also to use the rotary wipers and the cam drum. As a result an absolutely homogenous mixture is obtained.

I claim:

1. In an apparatus for performing mixing, reaction and dissolving processes between solid and liquid materials, in combination, a vertically disposed cylindrical housing, a rotatable shaft coaxially mounted in said housing, said shaft having an upper portion and a lower portion, a protective pipe spacedly enclosing said upper portion, a plurality of downwardly inclined stationary blades peripherally arranged in said pipe, a chute extending through said housing into said pipe, a plurality of downwardly inclined spaced blades secured to said shaft's upper portion below said chute and rotatable between said stationary blades, a rotary blade secured to said shaft below said inclined blades and of a larger diameter than said inclined blades, a plurality of inwardly constricted conical annular guides in the lower part of said housing, said guides forming chambers therebetween, said chambers having annular openings for the passage of mixed material, a rotary element tapering conically outwardly, mounted on the lower portion of said shaft between a pair of said guides, the lower part of the housing being provided with radially disposed nozzles for supplying liquid into said chambers.

References Cited

UNITED STATES PATENTS

| | | | |
|---|---|---|---|
| 19,696 | 3/1858 | Gage | 241—98 |
| 1,212,418 | 1/1917 | Sturtevant | 241—154 |
| 1,373,205 | 3/1921 | Popkess | 241—98 X |
| 1,636,033 | 7/1927 | Agnew | 241—154 X |
| 2,316,769 | 4/1943 | Chilson | 241—154 |
| 2,333,246 | 11/1943 | Harris | 241—60 |
| 2,543,599 | 2/1951 | Rietz | 241—41 X |
| 2,954,173 | 9/1960 | Dunwody | 241—41 X |
| 3,096,944 | 7/1963 | Schafer et al. | 241—42 X |

ANDREW R. JUHASZ, *Primary Examiner.*

FRANK T. YOST, *Assistant Examiner.*